INVENTORS
MARTIN J. GLENDAY
JOHN C. THOMAS
BY Olsen and Stephenson
ATTORNEYS

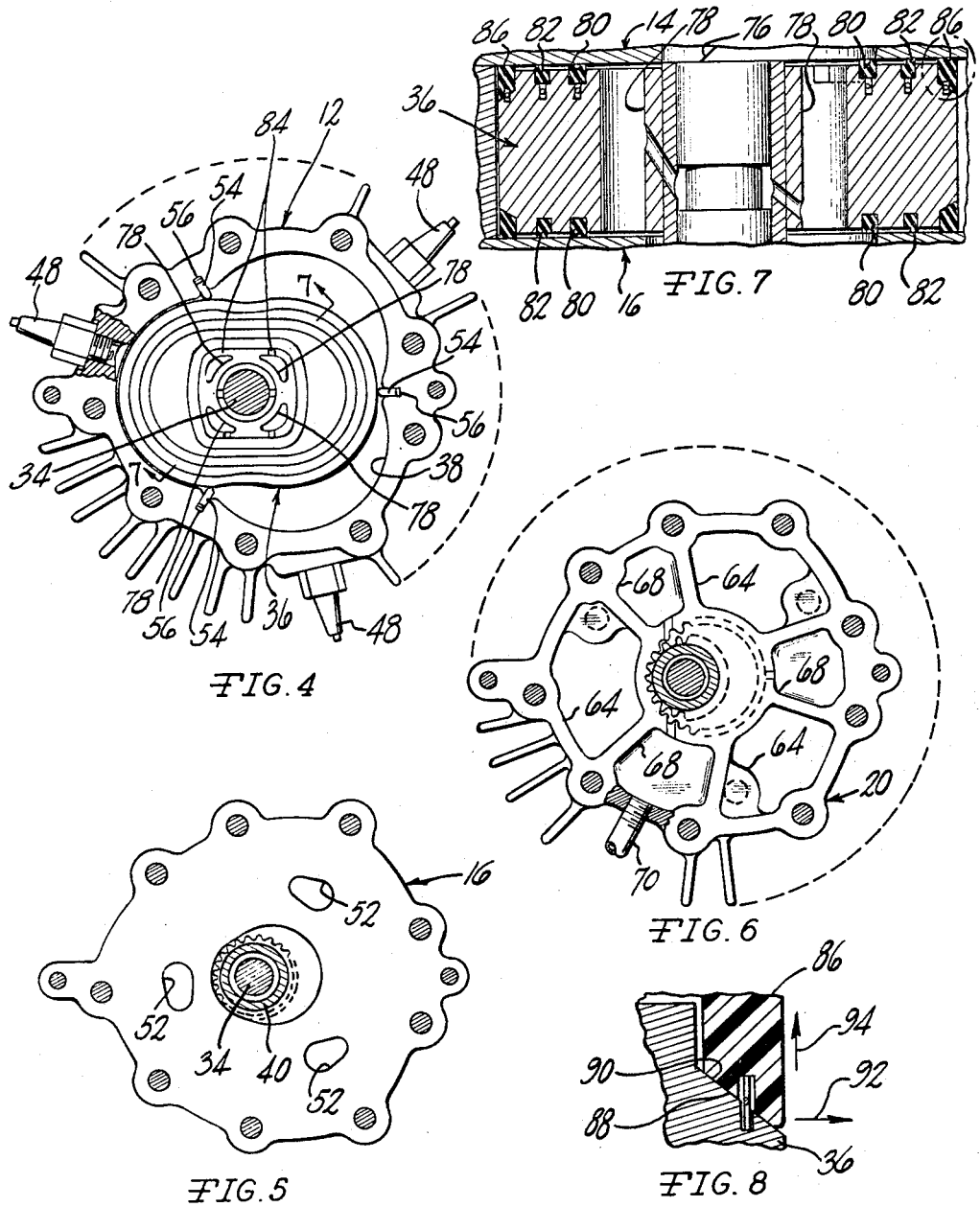

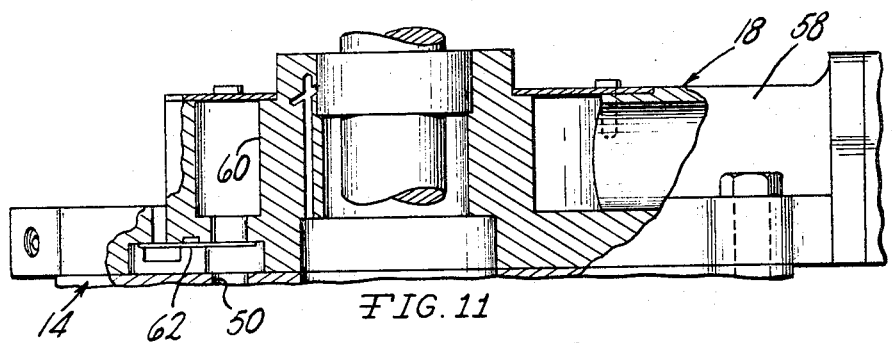
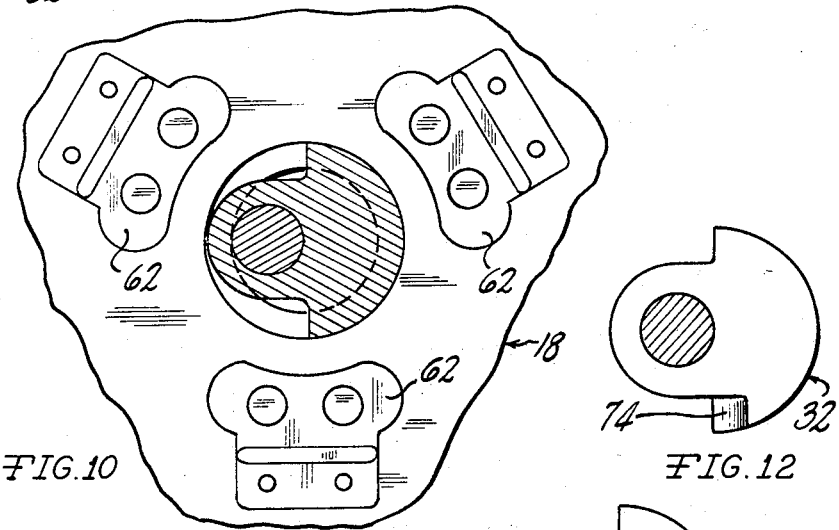
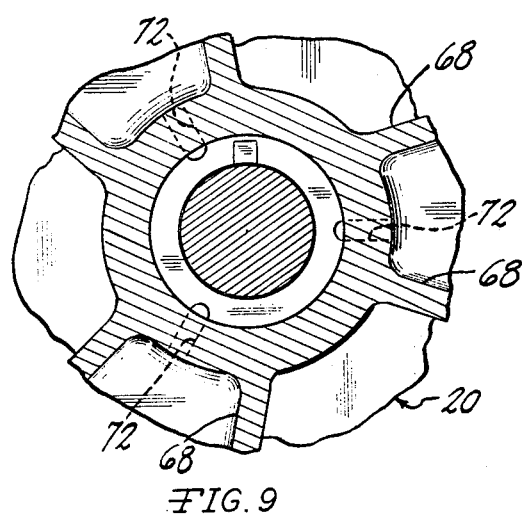

United States Patent Office 3,384,055  
Patented May 21, 1968

3,384,055  
ROTARY COMBUSTION ENGINE  
Martin J. Glenday, Box 104, and John C. Thomas, Tecumseh Road, both of Clinton, Mich. 49236  
Filed Dec. 28, 1966, Ser. No. 605,363  
8 Claims. (Cl. 123—8)

The present invention relates to improvements in rotary piston internal combustion engines of trochoidal construction which are provided with pistons adapted to carry out a rotary movement within a housing about an eccentric arranged on an output shaft of the engine.

One of the problems present when manufacturing relatively small engines of this character is that of producing such engines in a manner to make them competitive with the more conventional reciprocating piston engines now in use for lawn mowers, outboard engines, and the like. This problem stems in part from the need to produce a complete line of engines that have operating characteristics for fulfilling specific needs of various customers without requiring the designing and building of entirely separate and distinct engines to meet these requirements, each engine with parts that are usable only for that particular engine. As is readily understandable, this latter situation would substantially increase the cost of the engines, because if each requirement of a customer could be met only by designing and building a separate and completely distinct engine, the cost for each such engine would be relatively high if not completely uncompetitive with other types of engines.

Accordingly, it is an object of the present invention to provide a rotary piston engine which is constructed and arranged so that its components can be manufactured by mass production techniques to reduce their costs, and wherein different engines having a variety of operating characteristics can use interchangeably substantially all of such components while providing the desired engine operating characteristics.

It is another object of the present invention to provide a rotary piston engine of the foregoing character which has an inlet ports plate or a set of inlet and exhaust ports plates which can selectively be interchanged with different plates for selectively changing the operating characteristics of the engine.

It is still another object of the present invention to provide a rotary piston internal combustion engine of the foregoing character which is constructed and arranged to provide optimum lubricating conditions within the engine.

It is still another object of the present invention to provide a rotary piston internal combustion engine of the foregoing character which has improved compression sealing means for providing optimum sealing of the compression gases within the plurality of working spaces within the combustion chamber, and which means are constructed and arranged to compensate for thermal expansion of parts of the engine so as to provide desired sealing at elevated temperatures of the engine.

According to one form of the present invention, a rotary piston internal combustion engine of trochoidal construction is provided having a housing section with open ends and an interior side wall of trochoidal configuration. A first plate overlies one end of the housing section and contains inlet ports of desired shape and configuration. A second plate overlies the other end of the housing section and contains exhaust ports. An output shaft extends through the housing section and the plates and is provided with an eccentric on which a rotary piston is carried for rotary movement about the eccentric within the chamber defined by the housing section and the two plates. An induction member overlies the first plate and contains a passageway for supplying combustible fuel to the inlet ports. A base member overlies the exhaust-ports plate and contains a passageway for discharging exhaust gases which have passed through the exhaust ports. Means are provided for securing these members, plates and housing sections together so that any of a series of interchangeable plates having different ports shapes and configurations can be used selectively to provide an engine of pre-selected operating characteristics. As is to be understood, the inlet ports can be changed so as to vary the torque characteristics of the engine at different speeds so that an engine having characteristics most suitable for a particular need can be provided. Such an engine can be provided merely by selecting plates having inlet or inlet and exhaust ports of a predetermined design to meet the required needs, and the remaining engine components can be used as standard parts in all engines that are manufactured.

In one of the forms of the present invention the base member will provide a sump for lubricating oil, and splash or semi-forced feed means will be provided for lubricating the engine. It is also contemplated in some instances that a dry sump engine will be provided wherein the lubricant will be provided together with the fuel that is introduced through the induction member.

In a preferred form of the invention improved compression seal means are also provided. In this form of the invention the seal ring is made of material of a lower thermal coefficient expansion than the material of the piston. The seal ring has an inclined surface on its axially inner end, and the piston has a groove for receiving the ring and has an inclined surface complementary to the inclined surface of the ring, said inclined surfaces being arranged so that when the piston expands thermally relative to the ring in a radial direction, the ring will be urged axially against the plate having the inlet ports. Thus, an improved face seal is provided at elevated temperatures of the engine.

Other objects of this invention will appear in the following description and appended claims, reference being had to the accompanying drawings forming a part of this specification wherein like reference characters designate corresponding parts in the several views.

In the drawings:

FIGURE 4 is a section taken on the line 4—4 of FIGURE 1, illustrating a housing section defining a portion of the combustion chamber and showing a rotary piston therein;

FIGURE 5 is a section taken on the line 5—5 of FIGURE 1, illustrating the outlet or exhaust-ports plate;

FIGURE 6 is a section taken on the line 6—6 of FIGURE 1 showing the base member of the engine;

FIGURE 7 is an enlarged section taken on line 7—7 of FIGURE 4 disclosing details of the lubricating system;

FIGURE 8 is an enlarged fragmentary section of the encircled portion of FIGURE 7;

FIGURE 9 is an enlarged fragmentary section taken on the line 9—9 of FIGURE 1 and disclosing details of the lubricating oil system;

FIGURE 10 is an enlarged fragmentary section taken on the lines 10—10 of FIGURE 1 showing details of the inlet valves to the engine.

FIGURE 11 is a fragmentary section taken on the line 11—11 of FIGURE 2 showing details of the induction member overlying the inlet-ports plate;

Figure 1:
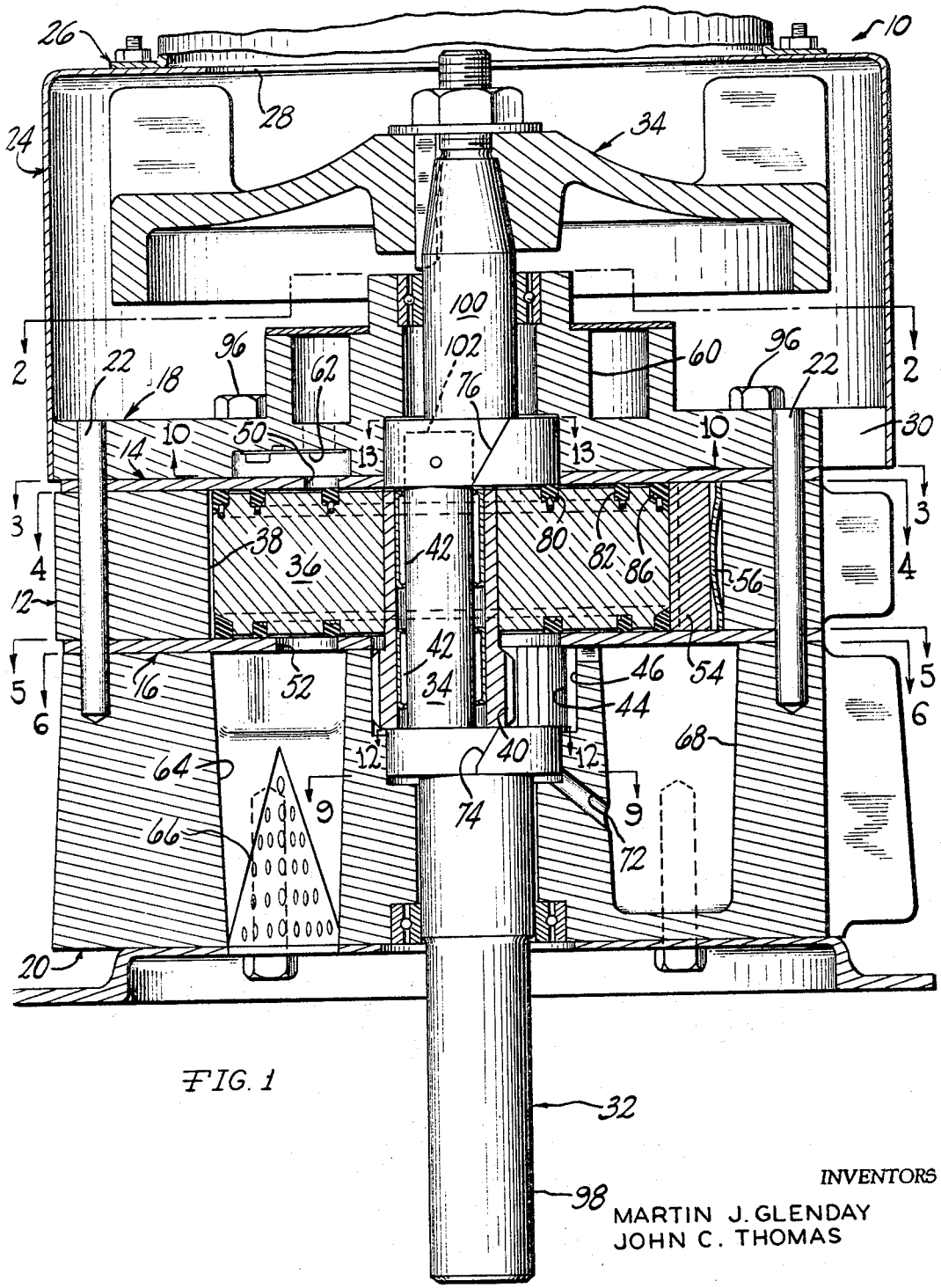
FIGURE 1 is a fragmentary vertical section taken on the line 1—1 of FIGURE 2, of one embodiment of the present invention.

FIGURES 12 and 13 are fragmentary sections taken respectively on the lines 12—12 and 13—13, illustrating additional details of the lubricating oil system of the engine; and FIGURES 14, 15, 16, 17 and 18 are schematic illustrations to show the operation of the engine embodying the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the illustrated embodiment of the invention will be described in greater detail. The rotary piston internal combustion engine 10 contains a housing section 12 which is open at its upper and lower ends. Overlying the open ends of the housing section 12 are the inlet-ports plate 14 and the exhaust-ports plate 16. Mounted above the inlet-ports plate 14 is the induction housing or member 18, and supported beneath the exhaust plate 16 is the base member 20. A plurality of dowel pins 22 are provided for aligning the parts together, and such dowel pins normally will be press fitted either into the induction member 18 or the base member 20. A blower housing 24 is fitted onto the induction member 18, and a housing for a starter (not shown) is normally positioned on the top of the blower housing 24 as shown at 26. The blower housing has an inlet opening at 28 for receiving air, and a plurality of radially disposed outlets are provided by the fins 30 which are located on the induction member 18. An output or crankshaft 32 is journaled in the induction member 18 and the base member 20 in a conventional manner. Secured to the upper end of the crankshaft 32 is a blower for blowing air through the openings provided by the radial fins 30. The crankshaft 32 has an eccentric 34 on which a rotary piston 36 is mounted for carrying out rotary movement about the eccentric within the chamber 38 defined by the housing section 12 and the plates 14 and 16.

The eccentric or crank pin 34 also supports a pinion gear 40 in coaxial alignment by means of a plurality of needle bearings 42. The teeth of the pinion gear 40 are in mesh with the ring gear 44 which is secured in place in the receptacle 46 within the base member 20. The ring gear 44 is coaxially aligned with the main portion of the crankshaft 32 so that the shaft 32 can be driven by operation of the rotary piston 36 in a manner to be described.

Figure 3:
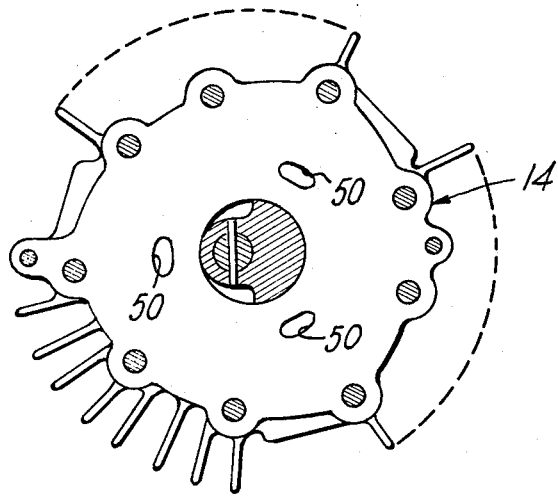
FIGURE 3 is a section taken on the line 3—3 of FIGURE 1, illustrating the inlet-ports plate of the engine.
Figure 14:
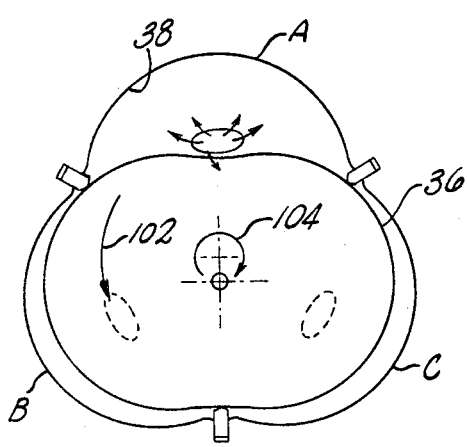

As shown best in FIGURE 4, the rotary piston 46 defines in cross-section generally a two-arched trochoid, and the piston 36 is adapted to rotate within the chamber 38 which defines in cross section generally a three-arched epitrochoid. By virtue of this arrangement, three separate working spaces are provided in chamber 38, and each such working space has its own spark plug 48 as well as an inlet port 50 formed in the inlet-ports plate 14 (FIG. 3), and an exhaust port 52 located in the exhaust-ports plate 16. The chamber seals 54 are carried in the housing section 12 to provide seals in conjunction with the rotary piston 36 for isolating the three working spaces from one another. For the purpose of maintaining the chamber seals 54 in engagement with the rotary piston 36, springs 56 are operably positioned between the compression seals 54 and the housing section 12.

Figure 2:
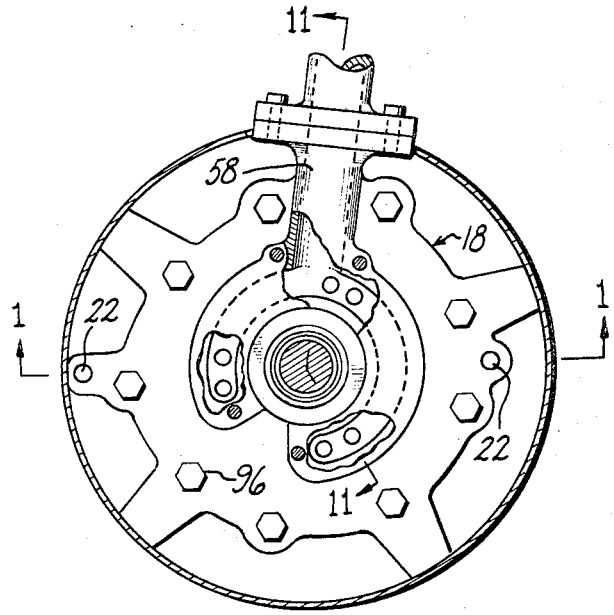
FIGURE 2 is a section taken on the line 2—2 of FIGURE 1, illustrating the induction housing of the engine.

The fuel mixture is introduced into the three working spaces of the chamber 38 by way of the induction housing 18, and in particular, through the intake tube 58. As best seen in FIGURES 1, 2 and 11, the fuel mixture is sucked through the tube 58 and passed around the annular chamber 60 from which it can flow past the reed valves 62 into the working spaces of the chamber 38.

The exhaust gases from the working spaces of the chamber 38 are discharged through the exhaust ports 52 in the exhaust ports plate 16 and passed through the exhaust ducts 64 to be discharged to the atmosphere. Suitable mufflers, such as shown at 66, may be positioned within the exhaust ducts 64.

The base member 20 also contains an oil sump 68 for lubricating oil for the engine. The lubricating oil can be filled into the sump 68 through the fill pipe 70 and the sump normally will be filled approximately to the level of the exhaust ports plate 16. When filled in this manner, the lubricating oil will also fill, by virtue of the ducts 72, the chamber 46 in which the ring gear 44 is located. It will be noted from FIGURES 1 and 12 that the crankshaft 32 has an inclined surface 74 which will force or splash the lubricating oil from within the chamber 46 upward between the needle bearings 42 to lubricate the various moving parts. At the upper end of the crankshaft 32 is another inclined surface 76 which will function to return the lubricating oil back to the chamber 46. The surface 76 serves to aid in directing the lubricating oil into the passageways 78 located in the piston 36. Suitable oil rings 80 and scraper rings 82, which function in the conventional manner, are also provided for aiding in returning lubricating oil to the sump. It will be observed that ducts 84 are provided in the upper face of the piston 36 which communicate between the oil ring 80 and the passageway 78.

One of the features of the present invention is the construction and arrangement of the compression rings 86 and the associated grooves in the rotary piston 36. As best seen in FIGURES 7 and 8, the compression ring 36 has an inclined surface 88 which is complementary to an inclined surface 90 on the rotary piston 36. The rotary piston 36 normally will be constructed from a material such as aluminum which will have a relatively greater thermal expansion than the material of the compression ring 86. Therefore, when the piston 36 expands thermally, in the direction of the indicating arrow 92, relative to ring 86, a component of force will be exerted on the inclined surface 88 of the compression ring 86 so as to urge the compression ring 86 in the direction of the indicating arrow 94. This will have the effect of improving the seal at higher temperatures of the engine between the ring 86 and the plate 14. It is to be observed that the rings which abut against the inlet-ports plate 14 have springs behind them to further assist in urging them against the inlet plate.

Another feature of the present invention is the arrangement whereby the operating characteristics of the engine can be determined in advance merely by selecting the proper set of inlet and exhaust plates 14 and 16. By varying the location and the size of the ports in the plates, the torque characteristics and horsepower characteristics of the engine can be controlled readily to meet the specific requirements of the customer. Thus, standard parts can be manufactured which will be suitable for a wide variety of engines, and only the plates 14 and 16 need be designed differently to meet the different demands of the customers. As previously indicated, the engine can be assembled and disassembled easily, and the various parts are aligned by means of the dowel pins 22. Once aligned, the parts are secured together by means of a plurality of bolts 96. Also, for the purpose of assembling the parts, the crankshaft 32 can be made in two parts, one being the lower portion 98 and the other being the upper portion 100 which are press fitted together at the joint indicated 102.

Reference is now made to FIGURES 14 through 18, for a brief description of the operation of the engine. For the purpose of describing the operation, the three work spaces within the chamber 38 have been identified by the reference letters A, B, and C. In the arrangement illustrated in FIGURE 14, the rotary piston 36 is shown rotating in a counter-clockwise direction as indicated by the reference arrow 102 and the axis of the eccentric is shown to be rotating in a clockwise direction as indicated by the indicating arrow 104. The combustible mixture of air and fuel is shown entering the work space A, while in work space B the compression phase of the cycle is being carried out, and in work space C the power or ignition phase of the cycle is occurring.

Figure 15:
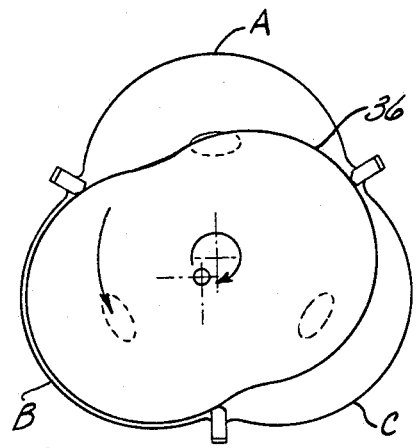
Figure 16:
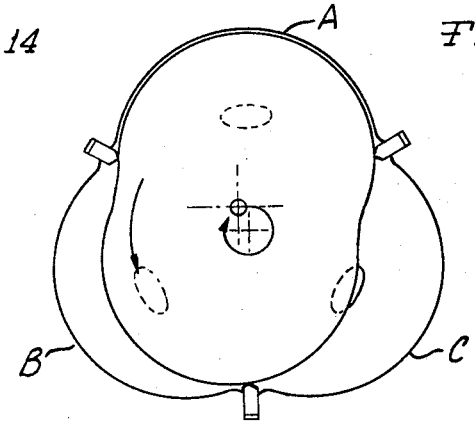

In FIGURE 15, the compression phase is starting in work space A as will be recognized by the fact that the inlet port is now nearly closed by the piston 36. In FIGURE 16 the work space A is now starting the ignition phase of its cycle while chamber B is in its power phase and chamber C is in its exhaust phase.

Figure 17:
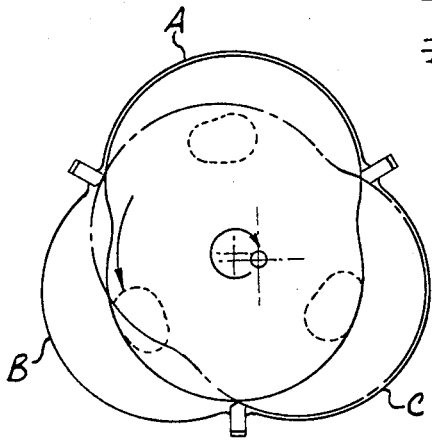
Figure 18:
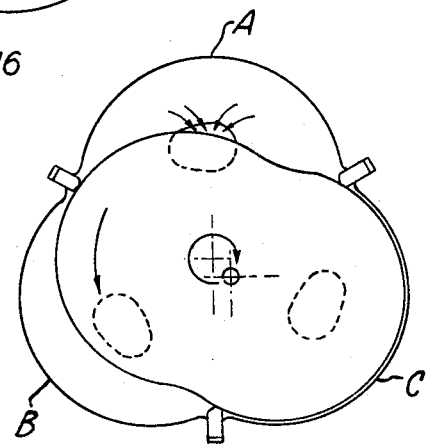

FIGURES 17 and 18 show the exhaust ports as distinguished from the first three figures in which the intake ports are shown. In FIGURE 17, the power phase is nearing its completion for the work space A as indicated by the broken or phantom line; the power phase extending from the starting position shown in solid line to the finishing position shown in broken line. It will be noted that in the phantom line position the work space B is now in its exhaust phase, whereas the work space C is now starting its compression phase. FIGURE 18 shows the work space A in its exhaust phase, work space B is in its compression phase and work space C is in its power phase. From these various illustrations showing the locations of the inlet ports and exhaust ports, it will readily be recognized by those skilled in the art that the operating characteristics of the engine can be altered merely by changing the size and location of the various inlet or outlet ports of the engine. It is contemplated that a variety of different plates 14 and 16 will be manufactured so that they can be selectively used with the remaining components of the engine to provide internal combustion engines meeting the specific torque, speed and horsepower demands of the customers.

It is also to be noted that the disclosed embodiment illustrates an internal combustion engine having an oil sump formed in the base member 20. It is also contemplated that the base member 20 can be made relatively smaller, eliminating the oil sump, and the engine can be lubricated by mixing a lubricant with the inlet fuel mixture in a manner well known in the art.

Having thus described my invention, I claim:

1. A rotary piston internal combustion engine of trochoidal construction comprising a housing section having open ends and an interior side wall of trochoidal configuration, a first plate overlying one end of said housing section and containing inlet ports, a second plate overlying the other end of said housing section and containing exhaust ports, an output shaft extending through said housing section and provided with an eccentric, a rotary piston adapted to carry out rotary movement about said eccentric within the chamber defined by said housing section and its associated first and second plates, an induction member overlying said first plate and containing a passageway for supplying combustible fuel to said inlet ports, a base member overlying said second plate and containing a passageway for discharging exhaust gases passing through said exhaust ports, and means securing said members, plates and housing section together so that any of a series of interchangeable plates having different port characteristics can be used to provide an engine of preselected operating characteristics.

2. A rotary piston internal combustion engine according to claim 1, wherein said housing section defines in cross section generally a three-arched epitrochoid and said rotary piston defines in cross section generally a two-arched epitrochoid.

3. A rotary piston internal combustion engine according to claim 1, wherein an annular compression sealing ring is carried on one end of said rotary piston and means are provided for urging the seal into engagement with said first plate.

4. A rotary piston internal combustion engine according to claim 3, wherein said sealing ring and said sealing ring and said one end of the rotary piston have complementary inclined surfaces arranged so that when said piston expands radially as a result of thermal expansion said sealing ring will be urged axially against said first plate.

5. A rotary piston internal combustion engine according to claim 1, wherein said base member defines a sump for lubricating oil, and means are provided for feeding oil from the sump to the bearings and other moving parts of the engine.

6. A rotary piston internal combustion engine according to claim 5, wherein said means includes inclined surfaces on said output shaft for feeding the oil from said sump axially toward the other end of the engine.

7. In a rotary piston internal combustion engine having housing means defining a chamber, said housing means having flat end walls, an output shaft extending through said chamber and provided with an eccentric and a rotary piston adapted to carry out rotary movement about said eccentric within said chamber, the improvement comprising a compression seal construction on said rotary piston for maintaining an effective compression seal between said piston and one of said end walls, said seal construction comprising a seal ring of lower thermal coefficient of expansion than said piston and having an inclined surface on its axially inner end, and said piston having a groove for receiving said ring and having an inclined surface complementary to the inclined surface of said ring, said inclined surfaces being arranged that when said piston thermally expands relative to said ring, the ring will be urged axially against said one end wall.

8. In a rotary piston internal combustion engine, the improvement according to claim 7, wherein spring means are positioned between said piston and said ring for constantly urging the ring against said one end wall.

References Cited

UNITED STATES PATENTS 3,134,600 5/1964 Fisch _____ 123—8
3,307,525 3/1967 McClure _____ 123—

RALPH D. BLAKESLEE, *Primary Examiner.*